United States Patent
Holava et al.

[15] 3,666,752
[45] May 30, 1972

[54] 4,4-DIPHENYLHEXAHYDROAZEPINE COMPOUNDS

[72] Inventors: Henry Michael Holava; Richard Anthony Partyka, both of Liverpool, N.Y.

[73] Assignee: Bristol-Myers Company, New York, N.Y.

[22] Filed: Mar. 9, 1970

[21] Appl. No.: 17,919

[52] U.S. Cl............260/239 B, 260/239.3 R, 260/566 A, 260/590, 260/599, 260/618 R, 424/244
[51] Int. Cl..................................C07d 41/04, C07d 41/06
[58] Field of Search ..........................260/239 B, 293 R

[56] References Cited

UNITED STATES PATENTS 3,468,893   9/1969   Mizzoni..........................260/293

OTHER PUBLICATIONS

Carruthers et al., J. Chem. Soc. (London), 1965, pp. 1653–1658.

*Primary Examiner*—Alton D. Rollins
*Attorney*—Herbert W. Taylor, Jr., Robert E. Havranek, Richard H. Brink and James Magee, Jr.

[57] ABSTRACT

4,4-Diphenylhexahydroazepine and derivatives thereof have been found to be useful antidepressant agents in the treatment of psychic depression in mammals. 4,4-Diphenylhexahydroazepine hydrochloride has been found to be particularly promising as it is characterized by a good therapeutic index.

7 Claims, No Drawings

4,4-DIPHENYLHEXAHYDROAZEPINE COMPOUNDS

BACKGROUND OF THE INVENTION

1. Field of the Invention

This invention relates to chemical compounds useful as antidepressant agents in the treatment of psychic depression.

2. Description of the Prior Art

The compounds of the present invention are new and novel. None of the prior art discloses, teaches or anticipates these compounds or their biological activity.

The most pertinent art appears to be:

1. F. G. Bordwell and K. M. Wellman, J. Org. Chem. 28, 2544 (1963) which describes the starting material, 4,4-diphenylcyclohexanone.

2. U.S. Pat. No. 3,376,312, reports the compound 1-hydroximino-4,4-diphenylcyclohexane.

3. U.S. Pat. No. 2,683,145 reports compounds of the generic formula

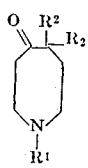

wherein $R^1$ is a lower alkyl group and $R^2$ represents an aryl group, such as phenyl and substituted phenyl, and the acid addition salts thereof. The compounds are described as having a depressor action on arterial blood pressure.

4. W. Carruthers and R. Johnstone, J. Chem. Soc., 1653 (1965) report the preparation of the compound

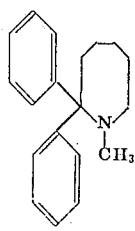

as a by-product of a reaction of their study. No biological activity is reported.

5. Other references describing phenyl substituted azepines are U.S. Pat. Nos. 2,666,050, 2,740,778, 2,740,777, 2,740,780 and 2,763,643. None of these references are anticipatory of the compound of the present invention.

SUMMARY OF THE INVENTION

The 4,4-diphenylhexahydroazepines of the present invention are compounds characterized by the formula

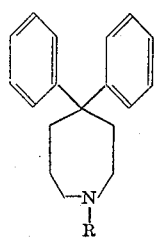

wherein R is H, (lower)alkyl, phenyl(lower)alkyl, (lower)alicyclic(lower)alkyl, di(lower)alkylamino(lower)alkyl, omega-hydroxy(lower)alkyl, (lower)alkynyl or (lower)alkenyl, and the pharmaceutically acceptable nontoxic acid additional salts thereof.

COMPLETE DISCLOSURE

This invention relates to new synthetic compounds of value as antidepressants in the treatment of psychic depression in mammals, including man.

The compounds are characterized as having the formula

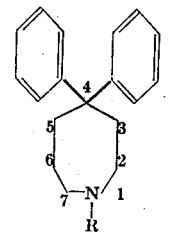

wherein R is hydrogen, (lower)alkyl, phenyl(lower)alkyl, (lower)-alicyclic(lower)alkyl, di(lower)alkylamino(lower)alkyl, omega-hydroxy(lower)alkyl, (lower)alkynyl or (lower)alkenyl, and the pharmaceutically acceptable nontoxic acid addition salts thereof.

The term "(lower)alkyl" as used herein means both straight and branched chain aliphatic hydrocarbon radicals having from one to eight carbon atoms, e.g., methyl, ethyl, propyl, isopropyl, butyl, isobutyl, t-butyl, amyl, hexyl, etc. Similarly, where the term "(lower)" is used as part of the description of another group, e.g., "(lower)alicyclic", it refers to the alkyl portion of such group which is therefore as described above in connection with "(lower)alkyl" and thus includes such radicals as cyclopropyl, cyclobutyl, cyclopentyl, cyclohexyl, cycloheptyl and cyclooctyl.

The pharmaceutically acceptable nontoxic acid addition salts include the mineral acid addition salts such as the hydrochloride, hydrobromide, hydroiodide, sulfate, sulfamate and phosphate, and the organic acid addition salts such as the maleate, acetate, citrate, succinate, benzoate, tartrate, fumarate, malate, mandelate, ascorbate and the like.

A preferred embodiment of the present invention is the compounds having the formula

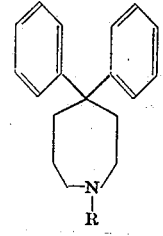

wherein R is H, (lower)alkyl, phenyl(lower)alkyl, (lower)alicyclic-(lower)alkyl, di(lower)alkylamino(lower)alkyl, omega-hydroxy(lower)-alkyl, (lower)alkenyl or (lower)alkenyl, and the pharmaceutically acceptable nontoxic acid addition salts thereof.

Another preferred embodiment of the present invention is the compounds of formula I wherein R is hydrogen, (lower)alkyl, (lower)alicyclic(lower)alkyl, phenyl(lower)alkyl, di(lower)alkyl amino(lower)alkyl, propargyl or propenyl; and the pharmaceutically acceptable nontoxic acid addition salt thereof.

A more preferred embodiment is the compounds of formula I wherein R is hydrogen, (lower)alkyl, propargyl, propenyl or (lower)-alicyclic(lower)alkyl; and a pharmaceutically acceptable nontoxic acid addition salts thereof.

A further preferred embodiment is the compounds of formula I wherein R is hydrogen or (lower)alkyl; and a pharmaceutically acceptable nontoxic acid addition salt thereof, especially the hydrochloride salts.

A most preferred embodiment is the compound 4,4-diphenyl hexahydroazepine and a pharmaceutically acceptable non-toxic acid addition salt thereof, especially the hydrochloride salt.

The compounds of the present invention are prepared by the following reaction schemes:

(A)

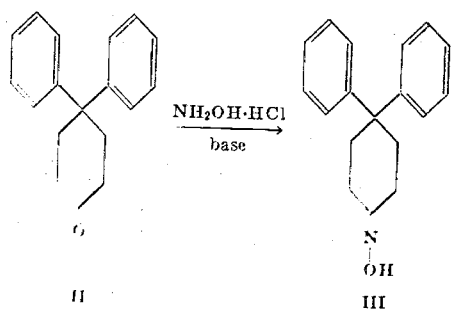

(B)

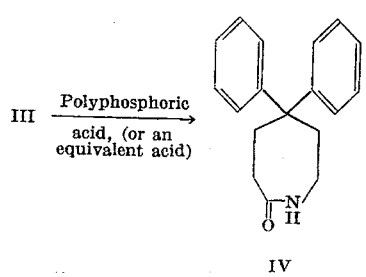

(C)

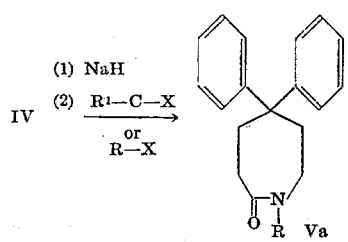

(D)

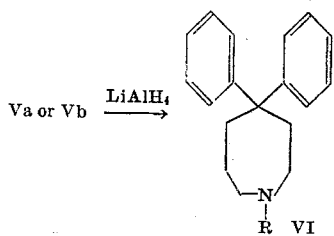

wherein $R^1$ and R are as described elsewhere but not including hydrogen.

Alternatively, the compounds I may be prepared as follows:

(A)

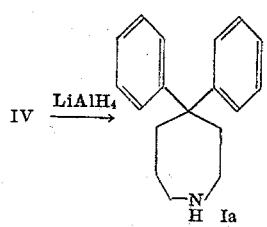

(B)

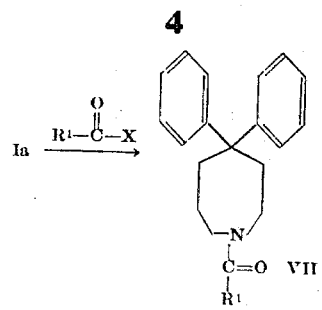

(C)

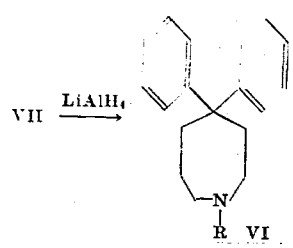

wherein R and $R^1$ are described elsewhere but not including hydrogen.

The objectives of the present invention have been achieved, by the provision according to the present invention, of the process for the synthesis of the compound having the formula

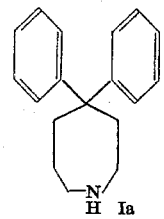

which process comprises the consecutive steps of
A. heating a compound having the formula

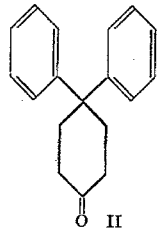

with at least an equimolar quantity, but preferably about a 10 percent excess, of hydroxylamine or hydroxylamine hydrochloride, in the presence of an organic solvent, but preferably pyridine or ethanol to produce a compound having the formula

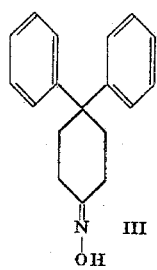

B. heating compound III in polyphosporic acid or its equivalent at a temperature of about 75° C. to about 125° C. for a period of 5 to 60 minutes to produce a compound having the formula

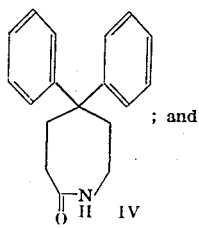
; and

C. treating compound IV with at least an equimolar quantity, but preferably about a 10 percent excess, of lithium aluminum hydride in an inert solvent, preferably an organic ether selected from the group comprised of tetrahydrofuran, dioxane and diethylether, but most preferably tetrahydrofuran, with or without the aid of heat, but preferably with heat up to the reflux temperature of the solvent, to produce compound Ia.

The objectives of the present invention have also been achieved by the process for the synthesis of compounds having the formula

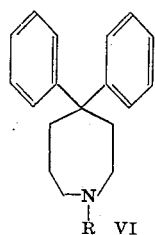

wherein R is (lower)alkyl, phenyl(lower)alkyl, (lower)alicyclic-(lower)alkyl, di(lower)alkylamino(lower)alkyl, omega-hydroxy-(lower)alkyl, (lower)alkynyl or (lower)alkenyl; which process comprises the consecutive steps of A. treating a compound having the formula

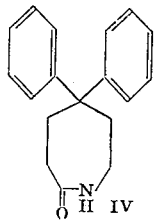

with at least an equimolar quantity, but preferably about a 10 percent excess, of sodium hydride with the aid of heat, at a temperature of about 40° C. to about 80° C., in an inert organic solvent, preferably selected from the group consisting of dioxane, dimethylformamide, tetrahydrofuran, and diethyl ether, but most preferably dimethylformamide, followed by the addition of at least an equimolar quantity, but preferably up to about a 10 percent excess, of a compound having the formula

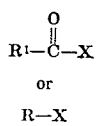

or

R—X in which X is chloro, bromo or iodo, $R^1$ and R are (lower)alkyl, phenyl(lower)alkyl, (lower)alicyclic(lower)alkyl, di(lower)alkylamino(lower)alkyl, (lower)alkenyl, (lower)-alkynyl or omega-hydroxy(lower)alkyl, $R^1$ is also phenyl or (lower)-alicyclic; to produce a compound having the formula

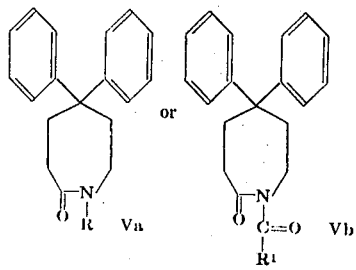

in which $R^1$ and R are as described above but not including hydrogen; and

B. treating compound Va and Vb with at least an equimolar quantity, but preferably about a 10 percent excess, of lithium aluminum hydride in an inert solvent, preferably an anhydrous organic ether selected from the group comprised of tetrahydrofuran, dioxane and diethylether, but most preferably tetrahydrofuran, with or without the aid of heat, but preferably with heat, up to the reflux temperature of the solvent to produce compound VI.

The objectives of the present invention have also been achieved by the process for the synthesis of compounds having the formula

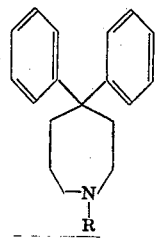

in which R is (lower)alkyl, phenyl(lower)alkyl, (lower)alicyclic-(lower)alkyl, di(lower)alkylamino(lower)alkyl, omega-hydroxy-(lower)alkyl, (lower)alkenyl or (lower)alkynyl; which process comprises the consecutive steps of A. treating the compound having the formula

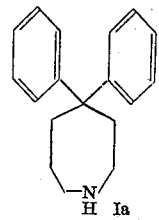

with at least an equimolar quantity, but preferably up to a 10 percent excess, of an acylating agent having the formula

in which X is chloro, bromo, iodo, $R^1$ is (lower)alkyl, phenyl-(lower)alkyl, phenyl, (lower)alicyclic, (lower)alicyclic(lower)-alkyl, di(lower)alkylamino(lower)alkyl, (lower)alkenyl, omega-hydroxy(lower)alkyl, or (lower)alkynyl; with or without the aid of heat, but preferably with the aid of heat up to the boiling point of the solvent system in an organic solvent, preferably benzene and an equimolar quantity of triethylamine to produce the compound having the formula

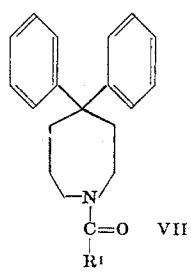

in which R¹ is as defined above; and

B. treating compound VII with at least an equimolar quantity, but preferably about a 10 percent excess, of lithium aluminum hydride in an inert solvent, preferably an anhydrous organic ether selected from the group comprised of tetrahydrofuran, dioxane and diethylether, but most preferably tetrahydrofuran, with or without the aid of heat, but preferably with heat up to the reflux temperature of the solvent, to produce compound I.

The compounds of the instant invention are biologically active as antidepressants in mammals, including man.

The compounds of the present invention have been screened through a variety of pharmacological tests using acknowledged standards for comparison; desipramine and amitriptylamine.

The most potent compound of the series appears to be the compound having the formula

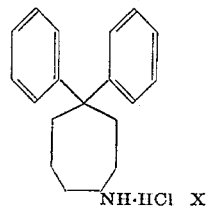

The following chart compares the antidepressant effect of X with desipramine and amitriptylamine.

CHART I

| Test | Effective Dose (mg./kg.) | | |
|---|---|---|---|
| | X | Desipramine | Amitriptyline |
| Lethal Dose (LD50) mouse po | >245 | 675 | 337 |
| Lethal Dose (LD50) rat po | >500 | — | — |
| Motor stimulation po | >80 | >100 | >100 |
| Reserpine reversal, mouse po | 3 | 3 | 5 |
| 5-Hydroxytryptophan (5—HTP) potentiation, mouse po | >50 | >20 | >20 |
| Tetrabenazine reversal, rat ip | 5 | 5 | >40 |
| Oxotremorine hypothermia, mouse ip | 5 | 0.5 | 5 |
| Reserpine hypothermia, mouse po | <1 | 0.5 | 2 |
| Yohimbine potentiation, dog po | 20 | 20 | 20 |
| Anorexia, mouse po | >50 | — | — |

In common with desipramine, X potentiated the action of exogenous catecholamines and reversed guanethidine blockade in the anesthetized cat nictitating membrane preparation. X did not have significant stimulant or anorectic activity in rodents.

The profile of X in laboratory animals is consistent with that of an antidepressant.

Chart II tabulates the pharmacological effect of other compounds of the present invention in three different antidepressant tests.

Chart II

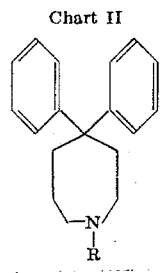

| R | Effective Dose (mg./kg.) | | |
|---|---|---|---|
| | Motor Stimulation po | Reserpine Reversal po | Tetrabenazine Reversal ip |
| CH₃ · HCl · ½H₂O | >50 | 3 | 20 |
| CH₂CH₃ · HCl | 12.5 | 1 | 20 |
| CH₂—C₆H₅ · HCl | 100 | 3 | 40 |
| CH₂CH₂N(CH₃)₂ · 2HCl · H₂O | >300 | ≤25 | >20 |
| CH₂◁ · HCl | 25 | ≤ 6 | ≥20 |
| CH₂CH₂—C₆H₅ | >300 | 25 ≤40 | |
| CH₂CH₂CH₂CH₃ · HCl | 50 | ≤25 | 20 |
| CH₂C≡CH · HCl | 25 | 6 | 20 |

The tests performed are generally known in the art and are essentially standard tests to determine antidepressant activity. The tests may be generally summarized as follows:

LD50 — Determined in groups of four mice using Weil's method.

Motor Stimulation — This is determined by subjective behavioral observation 1 and 3 hours after drug administration (Irwin. S., (1968), Psychopharmacologica, 13, 222).

Reserpine Reversal — Three hours after drug administration mice are given reserpine, 5 mg./kg. iv. This will induce ptosis and behavioral depression in control mice; antidepressants, monoamine oxidase inhibitors and some stimulants will present the appearance of these effects (Randall, L. O. and Bagdon, R. E. (1959), Ann N. Y. Acad. Sci., 80, 626).

5–HTP Potentiation — Injections of 5-hydroxytryptophan, 50 mg./kg. ip., produce behavioral stimulation in mice. Potentiation of this response by test compounds indicates potential monoamine oxidase inhibitory properties (Randal, L. O. and Bagdon, R. E. (1959), Ann N. Y. Acad. Sci., 80, 626).

Tetrabenazine Reversal — Tetrabenazine methanesulfonate, 35 mg./kg. ip., produces ptosis, hypoactivity and a low limb position in rats. Clinically useful antidepressants will prevent these tetrabenazine effects. This is considered our most valuable test for the preliminary evaluation of potential antidepressants (Pletscher, A. (1959), Ann. N. Y. Acad. Sci., 80, 1039).

Oxotremorine Hypothermia — Oxotremorine, 0.3 mg./kg. ip. induces tremor, salivation, lacrimation and a drop in rectal temperature in mice. Antidepressants will prevent the drop in rectal temperature.

Reserpine Hypothermia — Reserpine, 5 mg./kg. ip., causes a considerable fall in rectal temperature. Antidepressants, stimulants and monoamine oxidase inhibitors will reverse this hypothermia (Askeny B. (1963), Life Sci., 2, 725).

Yohimbine Potentiation in the Dog — Yohimbine, 0.5 mg./kg. iv., produces a characteristic behavioral stimulation in the dog and this is potentiated by clinically useful antidepressants but not stimulants (Sanghvi, I. and Gershon, S. (1969), Life Sci., 8, 449).

The methods outlined are all modifications from the references cited.

In the treatment of depression in animals, including man, the compounds of the present invention are administered orally and parenterally, in accordance with conventional procedures for the administration of antidepressants in an amount of from about 0.25 mg./kg./dose to 20 mg./kg./dose depending upon the route of administration. The preferred dosage for the compounds of the invention is in the range of about 0.25 to about 5 mg./kg./dose three to four times a day.

In particular, the oral dose in man of the compound 4,4-diphenylhexahydroazipine or the salt thereof is in the range of about 5 mg. to about 125 mg. three to four times a day, and most preferably in the range of 5 to 75 mg. three to four times a day.

Starting Materials 4,4-Diphenylcyclohexan-1-one.

A. Diphenylacetaldehyde: (Ref: Zimmerman and Schuster, J. Am. Chem. Soc., 84, 4527(1962)). — Hydrobenzoin was prepared by the reduction of benzil with sodium borohydride in 95 percent ethanol. In a large scale run, 867 g. of hydrobenzoin (85 percent yield), m.p. 137.5°–141.0°, was prepared in two batches from 1 kg. of benzil and 122 g. of sodium borohydride in 5.5 l. of ethanol. The hydrobenzoin above was dissolved in 3 l. of benzene to which was added 76 g. of p-toluenesulfonic acid. The mixture was heated to reflux and 167 ml. of water was collected in an azeotropic distillation apparatus over 2.5 hours. The mixture was heated at reflux for an additional 3 days. The organic solution was extracted with water and sodium bicarbonate solution and was dried over sodium sulfate. Benzene was removed in vacuo and the residue was distilled to give 447 g. (50 percent) of diphenylacetaldehyde, b.p. 143°–155° (0.65 mm.), $n^{25}D$ 1.5873–1.5884 (reported $n^{25}D$ 1.5876).

B. Diphenylcyclohex-2-en-1-one (Ref: Zimmerman and Schuster, J. Am. Chem. Soc., 84, 4527(1962)). — An approximately 40 percent aqueous solution of Triton B was prepared by adding sufficient water to a 40 percent solution of Triton B methoxide (benzyltrimethylammonium methoxide) in methanol (Matheson, Coleman and Bell) and distillation of the bulk of the methanol. In a typical run, the reagents were: 37.0 g. (0.19 mole) of diphenylacetaldehyde, 15.1 g. (0.21 mole) of methyl vinyl ketone (Pfizer), 31 ml. of aqueous Triton B solution (see above) and 125 ml. of t-butyl alcohol. The aldehyde and ketone were dissolved in the alcohol and the solution was cooled in ice. The base was added in small portions with shaking. If the mixture was not kept cool or if the base was added too rapidly, the mixture was found to darken considerably. With care, only slight darkening occurred. After 2 hours, ice was added and then ether. The layers were separated and the aqueous solution was extracted with ether. The ether extracts were extracted several times with water and were dried over sodium sulfate. The ether was removed in vacuo and the residue was taken up in sufficient hot ethanol and set aside to crystallize at room temperature. Rapid cooling inevitably led to separation of an oil. The first crop of slightly yellow crystals, after drying in vacuo, amounted to 18.87 g., m.p. 88.0°–90.5°. Concentration of the mother liquors afforded a second crop, 4.10 g., m.p. 88.0°–91.0°. The total yield was 49.1 percent of theory.

Anal. calc'd. for $C_{18}H_{16}O$: C, 87.06; H, 6.50
Found: C, 86.59; 86.65; H, 6.46; 6.61.

4,4-Diphenylcyclohex-2-en-1-one has intense infrared absorption bands at 6.00, 6.30, 6.75, 6.95 and 11.25 $\mu$. The ultraviolet spectrum (cyclohexane) had $\lambda_{max}$ 217 ($\epsilon$20,800), shoulders at 259, 264 and 271 ($\epsilon$ 1220), and $\lambda_{max}$ 318 m$\mu$ ($\epsilon$ 218).

C. 4,4-Diphenylcyclohexanone (Ref: Bordwell and Wellman, J. Org. Chem., 28, p. 2549(1963)). — 4,4-Diphenylcyclohex-2-en-one (6.80 g., 0.0274 mole) and 1.09 g. of 10 percent palladium-on-carbon (Englehard Industries, Inc.) were combined in 50 ml. of acetic acid and shaken under 35–50 lb. of hydrogen until uptake ceased (about 6 min.) and for 3 min. longer. The solution was diluted with 40 ml. of ether and filtered through diatomaceous earth. The filter cake was washed with three 50-ml. portions of ether, and the filtrate was poured into 200 ml. of ether and 500 ml. of water. The ethereal layer was separated and washed with water and dilute sodium bicarbonate. After drying and concentrating 6.71 g. (0.0268 mole, 98 percent yield) of 4,4-diphenylcyclohexanone, m.p. 140°–142°, was obtained. Recrystallization from heptane gave prismatic needles, m.p. 143°–144°; $\lambda_{max}^{KBr}$ 5.88 $\mu$.

Anal. calc'd. for $C_{18}H_{18}O$: C, 86.36; H, 7.24.
Found: C, 86.56; H, 7.21.

Experimental

EXAMPLE 1

1-Hydroximino-4,4-diphenylcyclohexane.

A mixture of 100 g. (0.40 mole) 4,4-diphenylcyclohexanone and 30.6 g. (0.44 mole) hydroxylamine hydrochloride in 475 ml. of pyridine was refluxed under anhydrous conditions with stirring for 3 hours. The reaction mixture was cooled and poured into an ice-water mixture and triturated until solid. The solid was filtered, washed with water and dried under vacuum over $P_2O_5$. Recrystallization from acetonitrile afforded the product (87 percent yield) with mp. 165°–166° C. A second crop was obtained with mp. 160°–161° C. The total yield was 95 percent.

EXAMPLE 2

5,5-Diphenylhexahydroazepine-2-one.

1-Hydroximino-4,4-diphenylcyclohexane (121 g., 0.456 mole) was added to 400 ml. of preheated polyphosphoric acid at 95° C. with vigorous stirring over a period of 6 minutes. The reaction temperature increased to 135° and at 140° solution occurred at which time the temperature increased to 155° C. After stirring for 6 minutes, the hot reaction mixture was then poured over 2 liters of ice with vigorous stirring. The resulting mixture was made basic with concentrated $NH_4OH$. Stirring was continued for 1.5 hours, adding additional $NH_4OH$ until the aqueous phase remained basic. The resultant solid was dissolved in $CHCl_3$ and washed with aqueous $NH_4OH$ twice, water, brine and dried over sodium sulfate. The solution was filtered and evaporated to give crude product. 400 ml. of ethanol was added to the crude product and the mixture was heated on a steam bath until solution occurred. Skellysolve B (petroleum solvent, essentially n-hexane, b.p. 62°–68° C.) was added and the solution was cooled to produce a white crystalline product which was collected by filtration. This procedure afforded 82.6 percent yield of product with m.p. 194°–197° C. A sample recrystallized from $CH_3CN$ gave analytically pure product with m.p. 196°–197° C.

Anal. calc'd. for $C_{18}H_{19}NO$:
C, 81.47%; H, 7.22%;
N, 5.28%.
Found: C, 81.17%; H, 7.21%;
N, 5.35%.

EXAMPLE 3

4,4-Diphenylhexahydroazepine hydrochloride.

5,5-Diphenylhexahydroazepine-2-one (2.65 g., 0.01 mole) as a solid was added under anhydrous conditions to a suspension of 0.42 g. (0.011 mole) of LAH (lithium aluminum hydride) in 70 ml. of dry THF (tetrahydrofuran). The dry THF was prepared by distillation over LAH. The reaction mixture was refluxed under nitrogen for 22 hours. After cooling, 1 ml. of water per 0.5 g. of LAH and 0.8 ml. of 10 percent sodium hydroxide per 0.5 g. of LAH used was added with vigorous stirring and the resultant mixture was stirred at room temperature for 2 hours. The mixture was filtered and the solids were washed with several portions of ether. The ether was evaporated to dryness. The residue was dissolved in anhydrous ether and dry hydrogen chloride gas was bubbled through the solution to produce a precipitate. The precipitate was collected by filtration and was washed with ether and dried. This procedure afforded 91 percent product with m.p. 246°–249° C. Recrystallization from ethanol-ether gave analytical sample, m.p. 248°–249° C.

Anal. calc'd. for $C_{18}H_{21}N \cdot HCl$: C, 75.15%; H, 7.71%; N, 4.87%; Cl, 12.32%.
Found: C, 75.06%; N, 7.96%; N, 4.90%; Cl, 12.50%.

EXAMPLE 4

1-Methyl-5,5-diphenylhexahydroazepine-2-one.

Solid 5,5-diphenylhexahydroazepine-2-one (5.3 g., 0.02 mole) was added under anhydrous conditions to a suspension of sodium hydride (0.85 g., 0.02 mole, 56.6 percent sodium hydride in mineral oil) in 40 ml. of redistilled DMF (dimethylformamdde). The suspension was heated to 60° C. with stirring for 45 minutes. The suspension was cooled and 1.4 ml. (0.02 mole) of methyl iodide was added. The mixture was stirred at room temperature for 3 hours and then poured into 150 ml. of water. The crystalline product was collected by filtration, washed with water and dried in vacuo over $P_2O_5$ to give 94 percent yield, m.p. 164°–166° C. A sample recrystallized from ethylacetate and Skelly B gave an analytical sample, m.p. 166°–168° C.

Anal. calc'd. for $C_{19}H_{21}NO$: C, 81.68%; H, 7.58%;
Found: C, 81.87%; H, 7.87%; N, 4.79%.

EXAMPLE 5

1-Ethyl-5,5-diphenylhexahydroazepine-2-one.

The same procedure and work up as described in Example 4, using 5.3 g. (0.02 mole) of NaH (56.6 percent in mineral oil), 1.8 ml. (0.022 mole) of iodoethane in 40 ml. DMF and 0.85 g. (0.02 mole) of 5,5-diphenylhexahydroazepin-2-one afforded an 89 percent yield of the product. Recyrstallization from $CH_3CN$ gave an analytical sample, m.p. 129°–131° C.

Anal. calc'd. for $C_{20}H_{23}NO$: C, 81.87%; H, 7.90%; N, 4.77%.
Found: C, 82.15%; H, 8.16%; N, 4.80%.

EXAMPLE 6

1-Benzyl-5,5-diphenylhexahydroazepine-2-one.

The same procedure and work up as described in Example 4, using 5.3 g. (0.02 mole) of 5,5-diphenylhexahydroazepin-2-one, 0.85 g. (0.02 mole) of NaH (56.6 percent in mineral oil) and 2.5 ml. (0.022 mole) of benzyl chloride in 40 ml. of DMF, afforded 84.4 percent yield of crude product after recrystallization from 95 percent ethanol-water, mp. 160°–162° C. Recrystallization from $CH_3CN$ gave an analytical sample, mp. 166°–168° C.

Anal. calc'd. for $C_{25}H_{25}NO$: C, 84.47%; H, 7.09%; N, 3.94%.
Found: C, 84.56%; H, 7.33%; N, 3.99%.

EXAMPLE 7

1-Methyl-4,4-diphenylhexahydroazepine hydrochloride hemihydrate.

The same procedure and work up as described in Example 3, using 4.39 g. (0.0157 mole) of 1-methyl-5,5-diphenylhexahydroazepine-2-one and 0.66 g. (0.0173 mole) of LAH in 70 ml. of THF afforded 97 percent yield of product after salt formation, mp. 175°–179° C. It was recrystallized from $CH_3CN$-ether to give an analytical sample, mp. 176°–177° C.

Anal. calc'd. for $C_{19}H_{23}N \cdot HCl \cdot \frac{1}{2} H_2O$: C, 73.41%; H, 8.11%; N, 4.51%; Cl, 11.40%; KF, 2.9%.
Found: C, 73.37%; H, 7.87%; N, 4.45%; Cl, 11.47%; KF, 3.9%.

EXAMPLE 8

1-Ethyl-4,4-diphenylhexahydroazepine hydrochloride.

The same procedure and work up as described in Example 3, using 1.68 g. (0.0057 mole) of 1-ethyl-5,5-diphenylhexahydroazepine-2-one and 0.24 g. (0.0063 mole) of LAH in 50 ml. of THF afforded 76.7 percent yield of product after salt formation, mp. 205°–208° C. Recrystallization from ethanol-ether produced a product having a mp. of 209°–211° C.

Anal. calc'd. for $C_{20}H_{25}N \cdot HCl$: C, 76.04%; H, 8.30%; N, 4.44%,
Found: C, 75.82%; H, 8.45%; N, 4.33%; Cl, 11.16%.

EXAMPLE 9

1-Benzyl-4,4-diphenylhexahydroazepine hydrochloride.

The same procedure and work up as described in Example 3, using 3.84 g. (0.0108 mole) of 1-benzyl-5,5-diphenylhexahydroazepine-2-one and 0.45 g. (0.0119 mole) of LAH in 70 ml. of THF gave a 72.4 percent yield of product after salt formation and mp. 130°–133° C. The melt resolidified and then melted at 200°–222° C. The crude product was recrystallized from ethanol-ether to give mp. 219°–223° C. (with melting and resolidifying as above). The product was stirred in ethyl acetate and refluxed for 5 minutes, cooled, filtered, washed with ether, and dried under high vacuum on $P_2O_5$ to give product with a mp. 221°–223° C.

Anal. calc'd. for $C_{25}H_{27}N \cdot HCl$: C, 79.45%; H, 7.47%; N, 3.71%; Cl, 9.38%.
Found: C, 79.35%; H, 7.57%, N, 3.62%; Cl, 9.37%.

EXAMPLE 10

1-(2-Dimethylaminoethyl)-5,5-diphenylhexahydroazepine-2-one hydrochloride.

Sodium hydride )0.85 g., 0.02 mole, 56.6 percent sodium hydride in mineral oil) was added to a solution of 5.3 g. (0.22 mole) of 5,5-diphenylhexahydroazepine-2-one in 50 ml. of freshly distilled DMF under anhydrous conditions. The mixture was allowed to stir at 60° C. for 1 hour. 1-Chloro-2-dimethylaminoethane (3.0 g., 0.028 mole) was added to the reaction mixture and was heated with stirring at 80° C. for 5 hours. The work-up was conducted as described in Example 4 and conversion of the base to the hydrochloride salt in ether afforded a 50 percent yield of the crude product.

The crude product was stirred in water and basified with 5 percent sodium carbonate, extracted with ether, washed with brine, dried over $Na_2SO_4$, filtered, and evaporated to dryness. The residue was dissolved in $CH_3CN$ and saturated with HCl. The slow addition of ether gave the HCl salt of the product. Recrystallization from $CH_3CN$-ether gave analytically pure sample, mp. 233.5°–234.5° C.

Anal. calc'd. for $C_{22}H_{28}N_2O \cdot HCl$: C, 70.85%; H, 7.84%; N, 7.51%; Cl, 9.53%.
Found: C, 70.60%; H, 7.85%; N, 7.46%; Cl, 9.56%.

EXAMPLE 11

1-(2-Dimethylaminoethyl)-4,4-diphenylhexahydroazepine dihydrochloride hydrate.

The procedure and work-up as described in Example 3 was carried out on 1.79 g. (0.00534 mole) of 1-(2-dimethylaminoethyl)-5,5-diphenylhexahydroazepine-2-one and 0.23 g. (0.00587 mole) of LAH in 50 ml. of THF to produce a 95 percent yield of product after salt formation. The product was recrystallized from ethanol-ether and dried at 110° C. under high vacuum over $P_2O_5$ to give an analytical sample, mp. 270°–271° C.

Anal. calc'd. for $C_{22}H_{30}N_2 \cdot 2HCl \cdot H_2O$: C, 63.91%; H, 7.80%; N, 6.78%; Cl, 17.15%; KF, 4.36%.
Found: C, 64.14%; H. 7.95%; N, 6.80%; Cl, 16.99%; KF, 3.76%.

EXAMPLE 12

1-Cyanomethyl-4,4-diphenylhexahydroazepine.

A mixture of 7.54 g. (0.03 mole) of 4,4-diphenylhexahydroazepine, 3.18 g. (0.03 mole) of sodium carbonate, and 2.5 g. (0.033 mole) of chloroacetonitrile in 60 ml. of dried, redistilled DMF was heated, with stirring, at 60°–65° C. for 4 hours under anhydrous conditions. The reaction mixture was then cooled and poured into 200 ml. of water and extracted with ether. The ether extracts were then washed with water, brine, dried over sodium sulfate, filtered, and evaporated to dryness. This procedure afforded 83 percent yield of produce with mp. 85°–89° C.

A sample was dissolved in $CH_3CN$-ether mixture and HCl was bubbled through. The HCl salt was filtered, washed with ether and dried. Recrystallization from $CH_3CN$-ether gave analytical sample, mp. 181°–183° C.

Anal. calc'd. for $C_{20}H_{22}N_2 \cdot HCl$: C, 73.49%; H, 7.09%; 8.57%; Cl, 10.85%.
Found: C, 73.39%; H, 7.19%; N, 8.54%; Cl, 11.02%.

EXAMPLE 13

1-(2-Propynyl)-4,4-diphenylhexahydroazepine hydrochloride.

A mixture of 3.77 g. (0.015 mole) 4,4-diphenylhexahydroazepine, 1.59 g. (0.015 mole) sodium carbonate and 2.02 g. (0.017 mole) of propargyl bromide in 50 ml. of dry DMF was heated under anhydrous conditions with vigorous stirring at 50°–60° C. for 3 hours. Work-up as described in Example 12 afforded a 58 percent yield of product after salt formation in ether; mp. 180°–188° C. Recrystallization twice from ethanol-ether gave mp. 208°–210° C.

Anal. calc'd. for $C_{21}H_{23}N \cdot HCl$: C, 77.40%; H, 7.42%; N, 4.30%; Cl, 10.88%.
Found: C, 77.20%; H, 7.53%; N, 4.20%; Cl, 10.81%.

EXAMPLE 14

1-Phenylacetyl-4,4-diphenylhexahydroazepine.

Phenylacetyl chloride (2.62 g., 0.017 mole) was added to a solution of 3.77 g. (0.015 mole) of 4,4-diphenylhexahydroazepine and 1.52 g. (0.015 mole) of triethylamine in 60 ml. of dry benzene under anhydrous conditions. The reaction mixture was refluxed with stirring for 5 hours, then cooled, evaporated to dryness and the residue was dissolved in ether. The ether solution was washed with water, aqueous $NH_4OH$, water, 5 percent HCl, water, and brine, and then dried over sodium sulfate, filtered and evaporated to dryness. The oily residue was used directly as is in Example 15 without further purification. The NMR (nuclear magnetic resonance), IR (infrared) and VPC (vapor pressure chromatography) spectra data were consistent for the structure of the product.

EXAMPLE 15

1-Phenethyl-4,4-diphenylhexahydroazepine hydrochloride.

A solution of 5.5 g. (0.015 mole) 1-phenylacetyl-4,4-diphenylhexahydroazepine in 15 ml. of dry THF was added under anhydrous conditions to a suspension of 0.65 g. (0.017 mole) of LAH in 35 ml. of THF and the mixture was refluxed for 17 hours with stirring. Work-up as described in Example 3 afforded in 84 percent yield of the HCl salt, mp. 165°–171° C. Recrystallization from $CH_3CN$-ether gave mp. 161°–164° C.

Anal. calc'd. for $C_{26}H_{29}N \cdot HCl$: C, 79.67%; H, 7.74%; N, 3.57%; Cl, 9.04%.
Found: C, 79.54%; 7.87%; N, 3.60%; Cl, 9.14%.

EXAMPLE 16

1-Butyryl-4,4-diphenylhexahydroazepine.

The same procedure and work-up as described in Example 14 using 3.77 g. (0.015 mole) 4,4-diphenylhexahydroazepine, 1.52 g. (0.015 mole) of triethylamine, and 1.81 g. (0.017 mole) of butyryl chloride in 50 ml. of dry benzene, afforded an oily product which was used directly in next step without further purification. The IR, NMR, and VPC spectra data were consistent for the product.

EXAMPLE 17

1-n-Butyl-4,4-diphenylhexahydroazepine hydrochloride.

The same procedure and work-up as described in Experiment 15 using 4.82 g. (0.015 mole) of 1-butyryl-4,4-diphenylhexahydroazepine, 0.65 g. (0.017 mole) of LAH in 50 ml. of THF afforded a 97.5 percent yield of product after salt formation.

Recrystallization from $CH_3CN$-ether gave analytical sample, mp. 198°–201° C.

Anal. calc'd. for $C_{22}H_{29}N \cdot HCl$: C, 76.83%; H, 8.79%; N, 4.07%; Cl, 10.21%.
Found: C, 77.01%; H. 8.98%; N, 4.01%;

EXAMPLE 18

1-Cyclopropylcarbonyl-4,4-diphenylhexahydroazepine.

Cyclopropylcarbonyl chloride (1.72 g., 0.0165 mole) was added to a solution of 3.77 g. (0.015 mole) of 4,4-diphenylhexahydroazepine and 1.52 g. (0.015 mole) triethylamine in 60 ml. dry benzene under anhydrous conditions. The reaction mixture was refluxed for 4 hours with stirring, then cooled and evaporated to dryness in vacuo. The residue was dissolved in ether. The ether solution was washed with water, 5 percent bicarbonate, water, 5 percent HCl water, brine, dried over $Na_2SO_4$, filtered, and evaporated to dryness. Addition of n-pentane and cooling afforded 93.4 percent yield of solid product. Recrystallization from cyclohexane-n-pentane gave mp. 100°–102° C. A sample recrystallized from ethanol-water gave analytically pure product, mp. 99°–101° C.

Anal. calc'd. for $C_{22}H_{25}NO$: C, 82.72%; H, 7.89%; N, 4.38%.
Found: C, 82.52%; H, 7.88%; N, 4.37%.

EXAMPLE 19

1-Cyclopropylmethyl-4,4-diphenylhexahydroazepine hydrochloride.

The same procedure and work up as described in Example 3, using 1.2 g. (0.006 mole) of 1-cyclopropylcarbonyl-4,4-diphenylhexahydroazepine and 0.25 g. (0.0066 mole) of LAH in 50 ml. of dry THF afforded, after salt formation and recrystallization from $CH_3CN$, 63 percent yield of product with a mp. 225°–227° C.

Anal. calc'd. for C$_{22}$H$_{27}$N·HCl: C, 77.28%; H, 8.25%; N, 4.10%; Cl, 10.37%.
Found: C, 77.50%; H, 8.46%; N, 4.17%; Cl, 10.45%.

We claim:
1. A compound having the formula

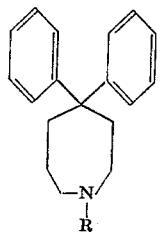

wherein R is hydrogen, (lower)alkyl, phenyl(lower)alkyl, (lower)-alicyclic(lower)alkyl, di(lower)alkylamino(lower)alkyl, [omega-hydroxy(lower)alkyl,] (lower)alkenyl, or (lower)alkynyl; and the pharmaceutically acceptable nontoxic acid addition salts thereof.

2. The compounds of claim 1 in which R is hydrogen, (lower)alkyl, (lower)alicyclic(lower)alkyl, phenyl(lower)alkyl, di(lower)alkylamino(lower)alkyl, propargyl or propenyl; and a pharmaceutically acceptable nontoxic acid addition salt thereof.

3. The compounds of claim 1 in which R is hydrogen, (lower)alkyl, propenyl, propargyl or (lower)alicyclic(lower)alkyl; and the pharmaceutically acceptable nontoxic acid addition salt thereof.

4. The compounds of claim 1 in which R is hydrogen or (lower)alkyl; and a pharmaceutically acceptable nontoxic acid addition salt thereof.

5. The hydrochloride salts of the compounds of claim 4.
6. 4,4-Diphenylhexahydroazepine.
7. The hydrochloride salt of the compound of claim 6.

* * * * *

PO-1050
(5/69)

UNITED STATES PATENT OFFICE
CERTIFICATE OF CORRECTION

Patent No. 3,666,752          Dated   May 30, 1972

Inventor(s)  Henry Michael Holava and Richard Anthony Partyka

It is certified that error appears in the above-identified patent and that said Letters Patent are hereby corrected as shown below:

Claim 1 should read as follows:

A compound having the formula

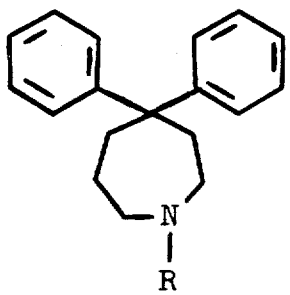

wherein R is hydrogen, (lower)alkyl, phenyl(lower)alkyl, (lower)-alicyclic(lower)alkyl, di(lower)alkylamino(lower)alkyl, (lower)-alkenyl, or (lower)alkynyl; and the pharmaceutically acceptable nontoxic acid addition salts thereof.

Signed and sealed this 21st day of November 1972.

(SEAL)
Attest:

EDWARD M. FLETCHER, JR.
Attesting Officer

ROBERT GOTTSCHALK
Commissioner of Patents